US012144086B2

(12) United States Patent
Yoon et al.

(10) Patent No.: US 12,144,086 B2
(45) Date of Patent: Nov. 12, 2024

(54) INDUCTION HEATING DEVICE AND METHOD OF CONTROLLING THE SAME

(71) Applicant: LG ELECTRONICS INC., Seoul (KR)

(72) Inventors: Bada Yoon, Seoul (KR); Gwang Rok Kim, Seoul (KR); Wongyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 919 days.

(21) Appl. No.: 17/271,823

(22) PCT Filed: Aug. 30, 2019

(86) PCT No.: PCT/KR2019/011167
§ 371 (c)(1),
(2) Date: Feb. 26, 2021

(87) PCT Pub. No.: WO2020/046048
PCT Pub. Date: Mar. 5, 2020

(65) Prior Publication Data
US 2021/0321494 A1 Oct. 14, 2021

Related U.S. Application Data

(60) Provisional application No. 62/724,763, filed on Aug. 30, 2018.

(51) Int. Cl.
*H05B 6/06* (2006.01)

(52) U.S. Cl.
CPC .................................... *H05B 6/065* (2013.01)

(58) Field of Classification Search
CPC . H05B 6/06; H05B 6/08; H05B 6/065; H05B 6/1245; H05B 6/1272; H05B 6/44; C12Q 1/6837; C12Q 1/6883
See application file for complete search history.

(56) References Cited

U.S. PATENT DOCUMENTS 7,910,865 B2 3/2011 Haag et al.
RE43,263 E 3/2012 Barragan et al.
(Continued)

FOREIGN PATENT DOCUMENTS

EP 2506663 5/2017
EP 2506665 5/2017
(Continued)

OTHER PUBLICATIONS

European Search Report issued in application No. 19855441.2 dated Apr. 12, 2022.
(Continued)

*Primary Examiner* — Brian W Jennison
(74) *Attorney, Agent, or Firm* — KED & Associates LLP

(57) ABSTRACT

According to an embodiment, a method of controlling an induction heating device comprises determining a first target frequency of a first working coil corresponding to a driving command for the first working coil, determining a second target frequency of a second working coil corresponding to a driving command for the second working coil, determining a final driving frequency of the first working coil and a final driving frequency of the second working coil based on the first target frequency and the second target frequency, determining output control methods of the first working coil and the second working coil based on the first target frequency, the second target frequency, the final driving frequency of the first working coil, and the final driving frequency of the second working coil, and driving the first working coil and the second working coil at the final driving frequencies according to the output control methods.

20 Claims, 10 Drawing Sheets

(56) References Cited

U.S. PATENT DOCUMENTS

| | | | | |
|---|---|---|---|---|
| 9,326,329 | B2 * | 4/2016 | Kitaizumi | H05B 6/065 |
| 11,395,378 | B2 * | 7/2022 | Jung | H02M 1/34 |
| 2007/0135037 | A1 * | 6/2007 | Barragan Perez | H02M 1/44<br>455/7 |
| 2008/0087661 | A1 | 4/2008 | Haag et al. | |
| 2010/0237065 | A1 * | 9/2010 | Cho | H05B 6/065<br>219/624 |
| 2012/0248098 | A1 | 10/2012 | Lee et al. | |
| 2016/0323937 | A1 * | 11/2016 | Anton Falcon | H05B 6/062 |

FOREIGN PATENT DOCUMENTS

| | | |
|---|---|---|
| JP | 2012-084509 | 4/2012 |
| JP | 2017-168236 | 9/2017 |
| KR | 10-2012-0109965 | 10/2012 |
| KR | 10-1735754 | 5/2017 |
| KR | 10-2017-0075913 | 7/2017 |

OTHER PUBLICATIONS

International Search Report and Written Opinion dated Dec. 19, 2019 issued in Application No. PCT/KR2019/011167.

* cited by examiner

[Fig. 1]
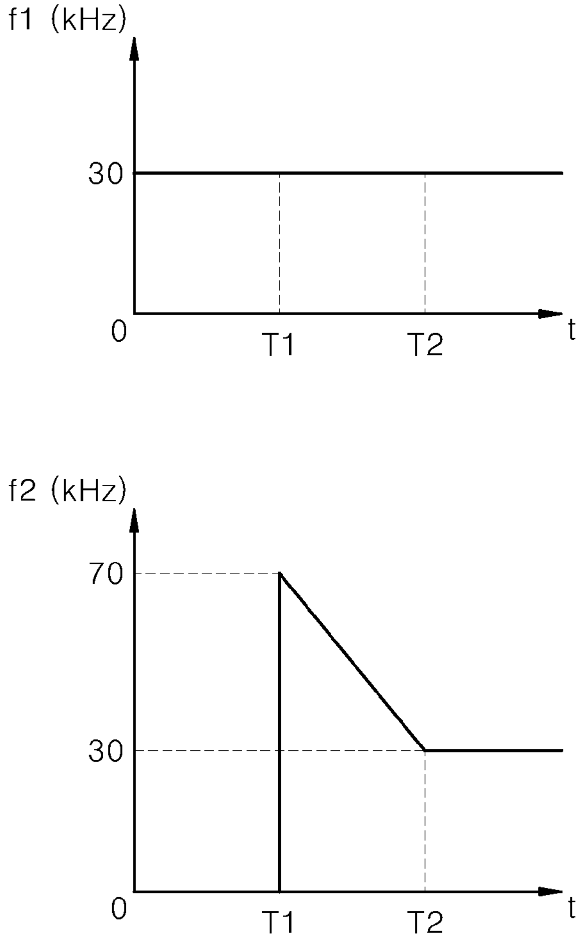

[Fig. 2]
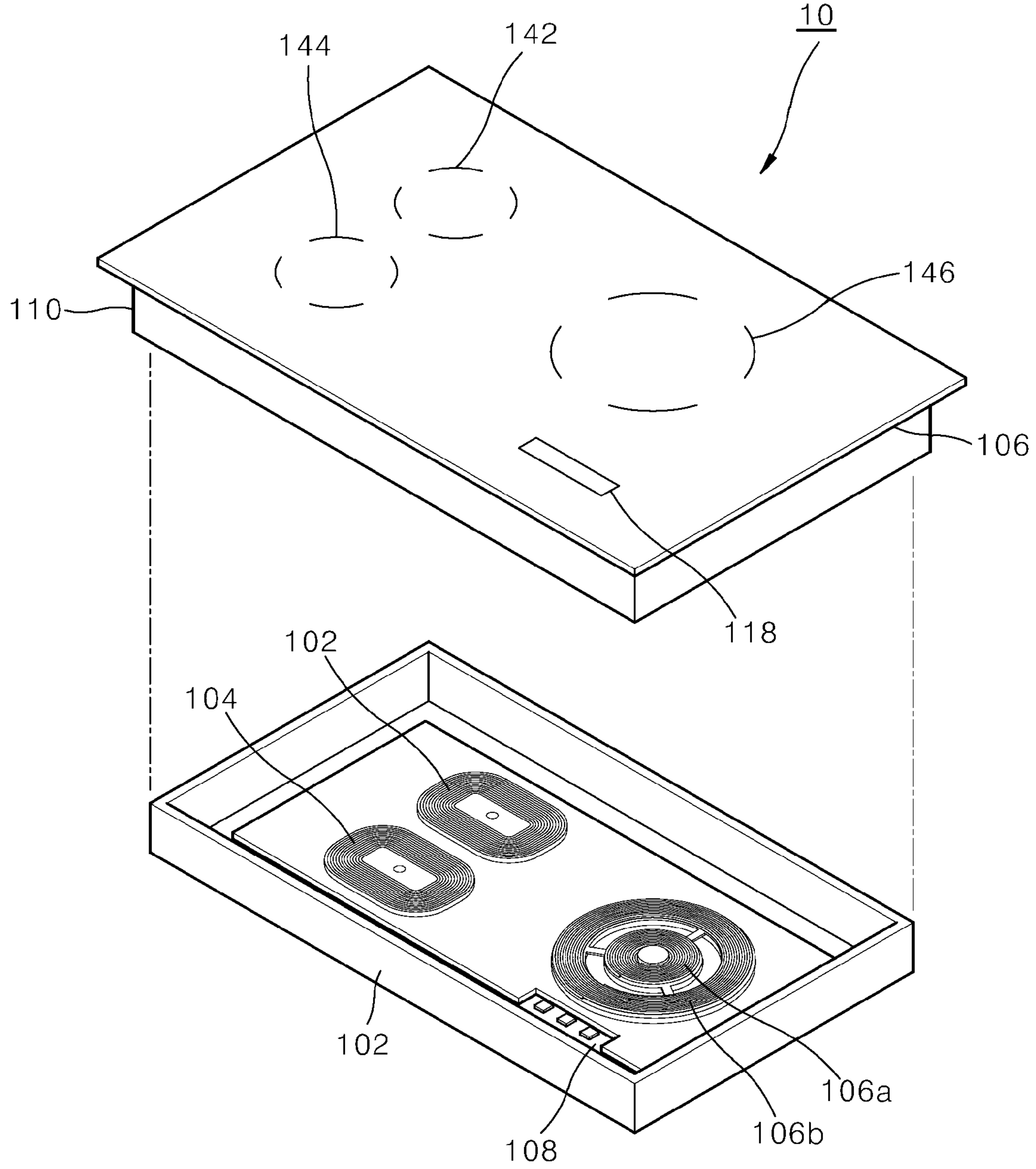

[Fig. 3]
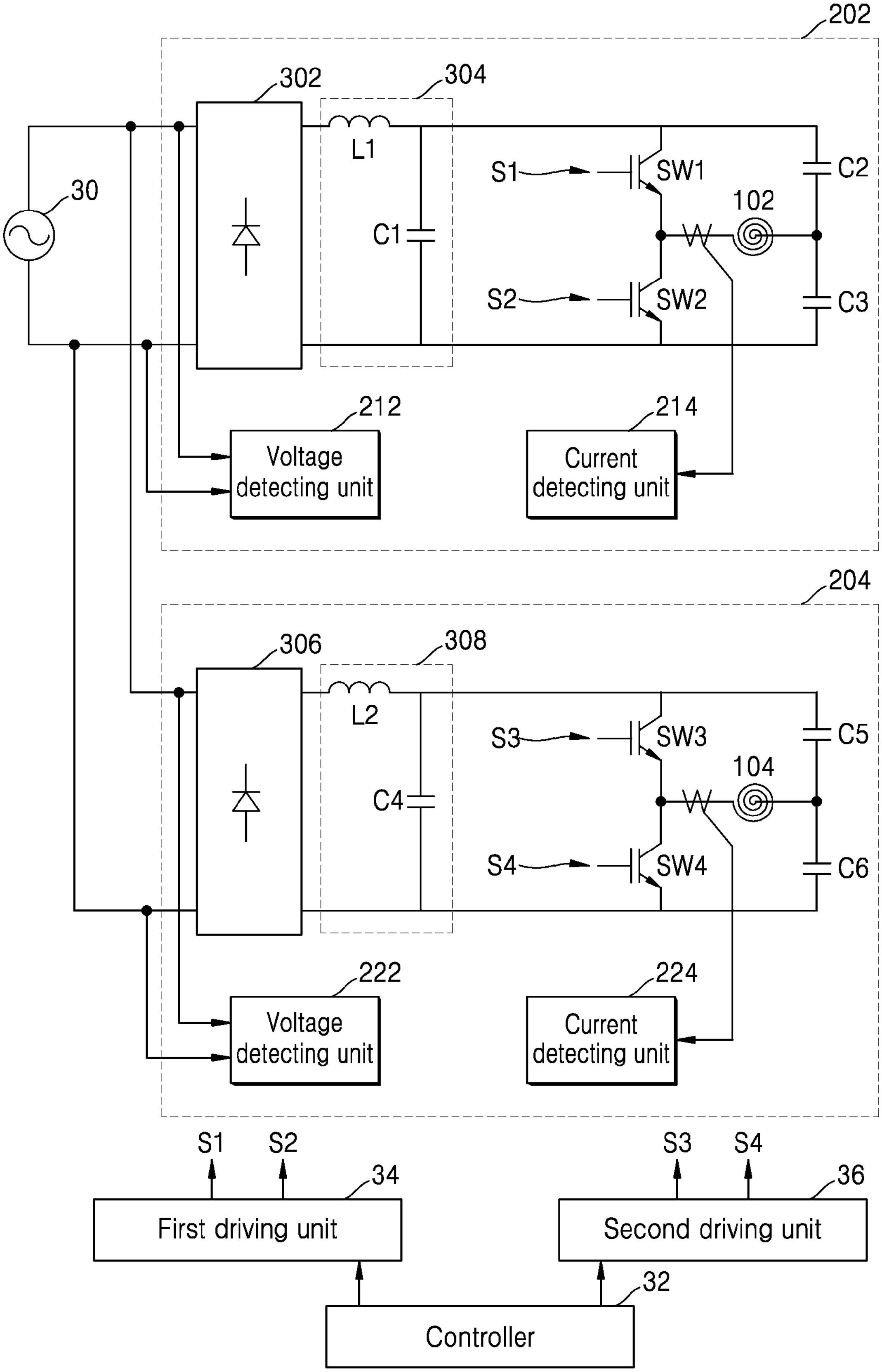

[Fig. 4]
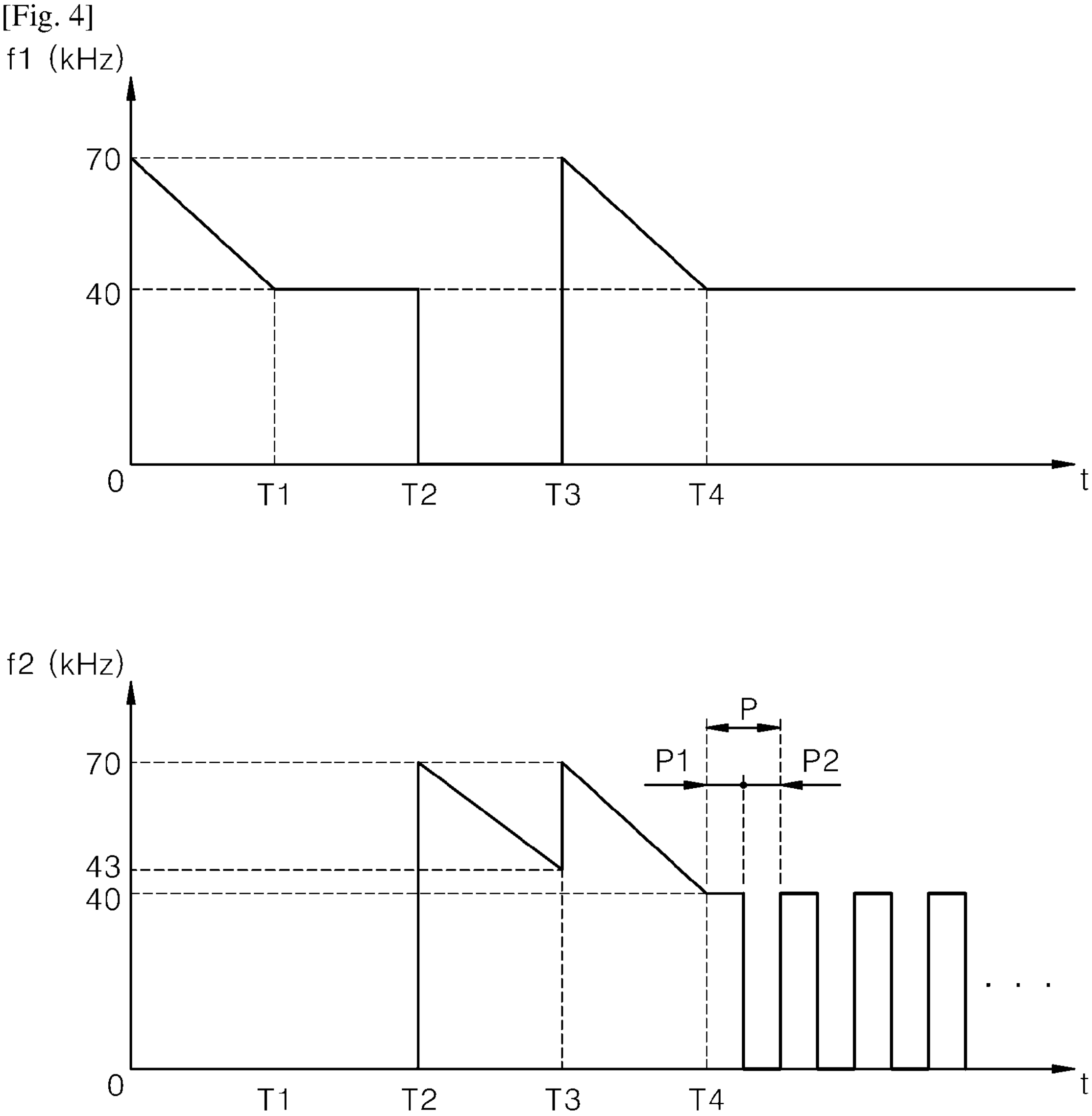

[Fig. 5]
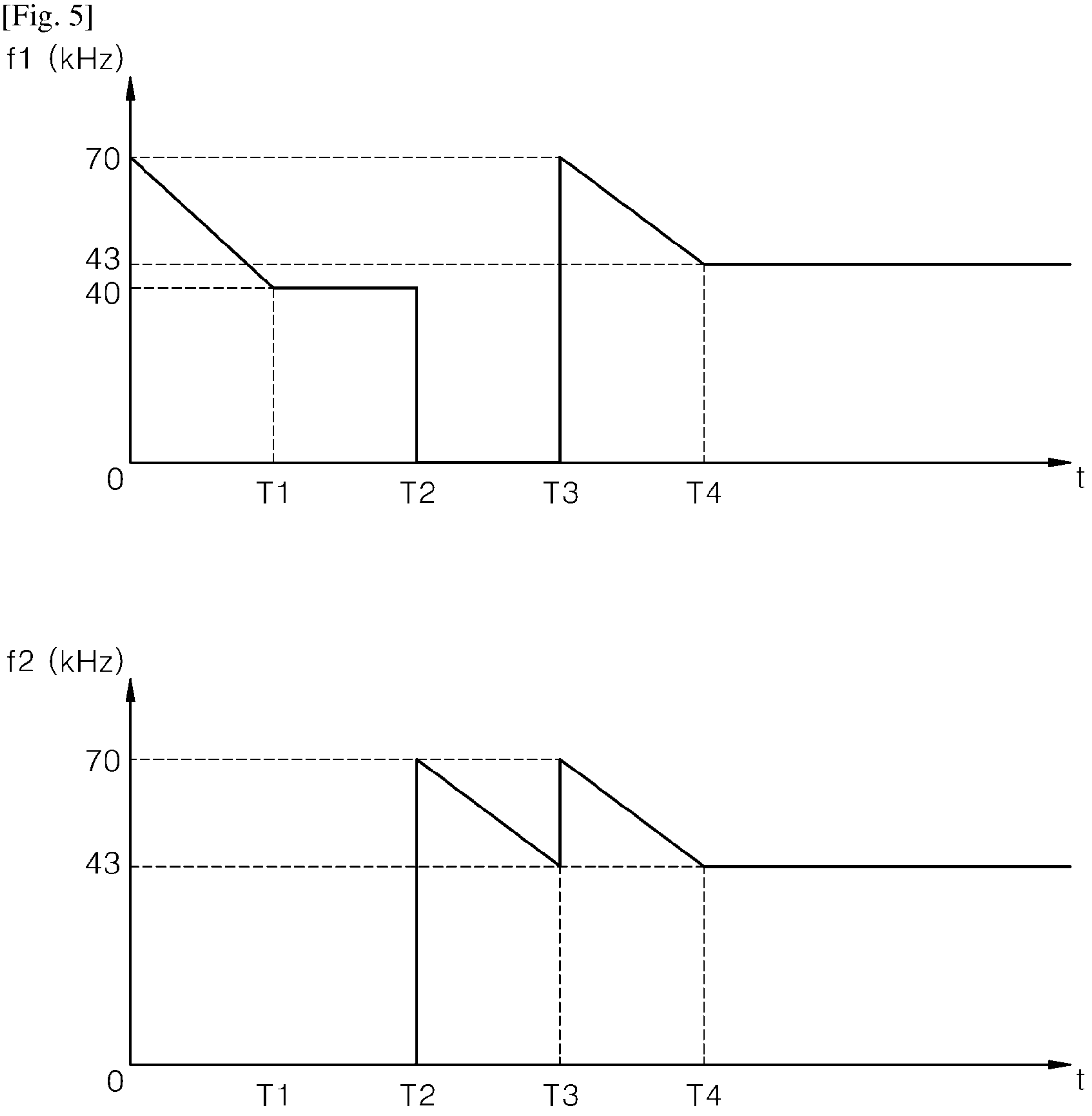

[Fig. 6]
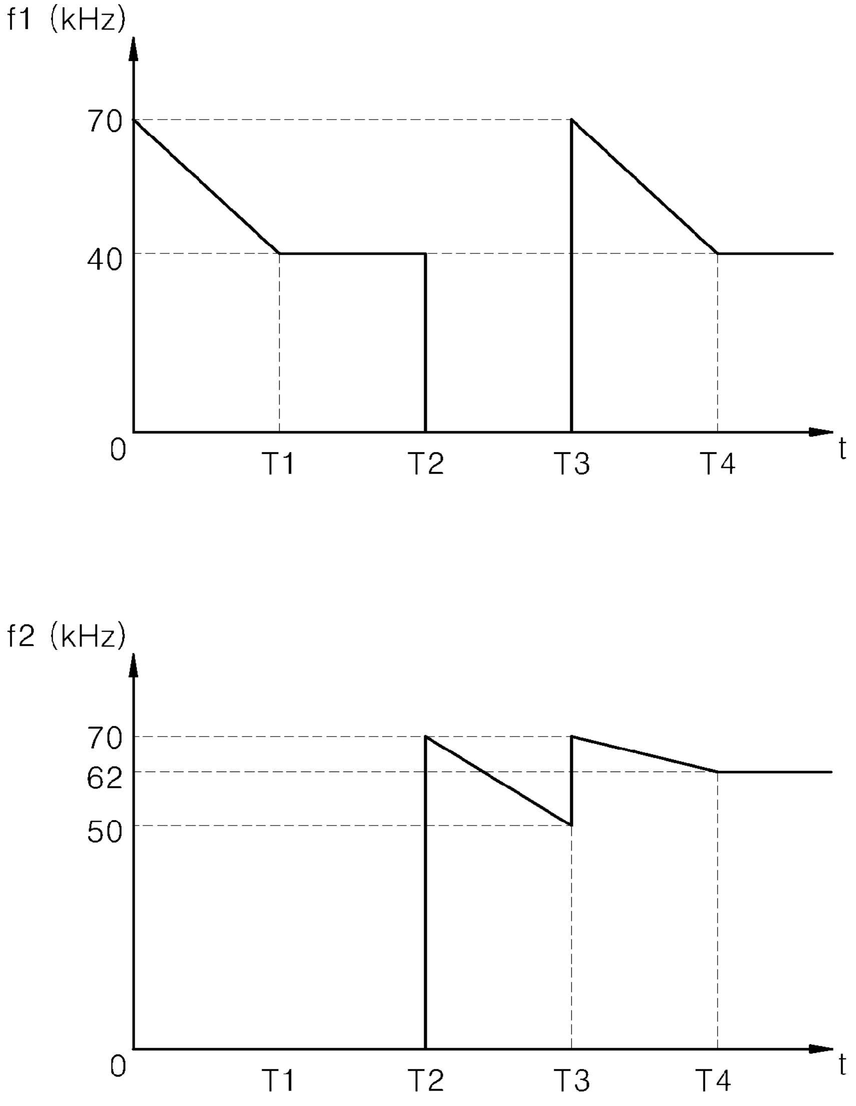

[Fig. 7]
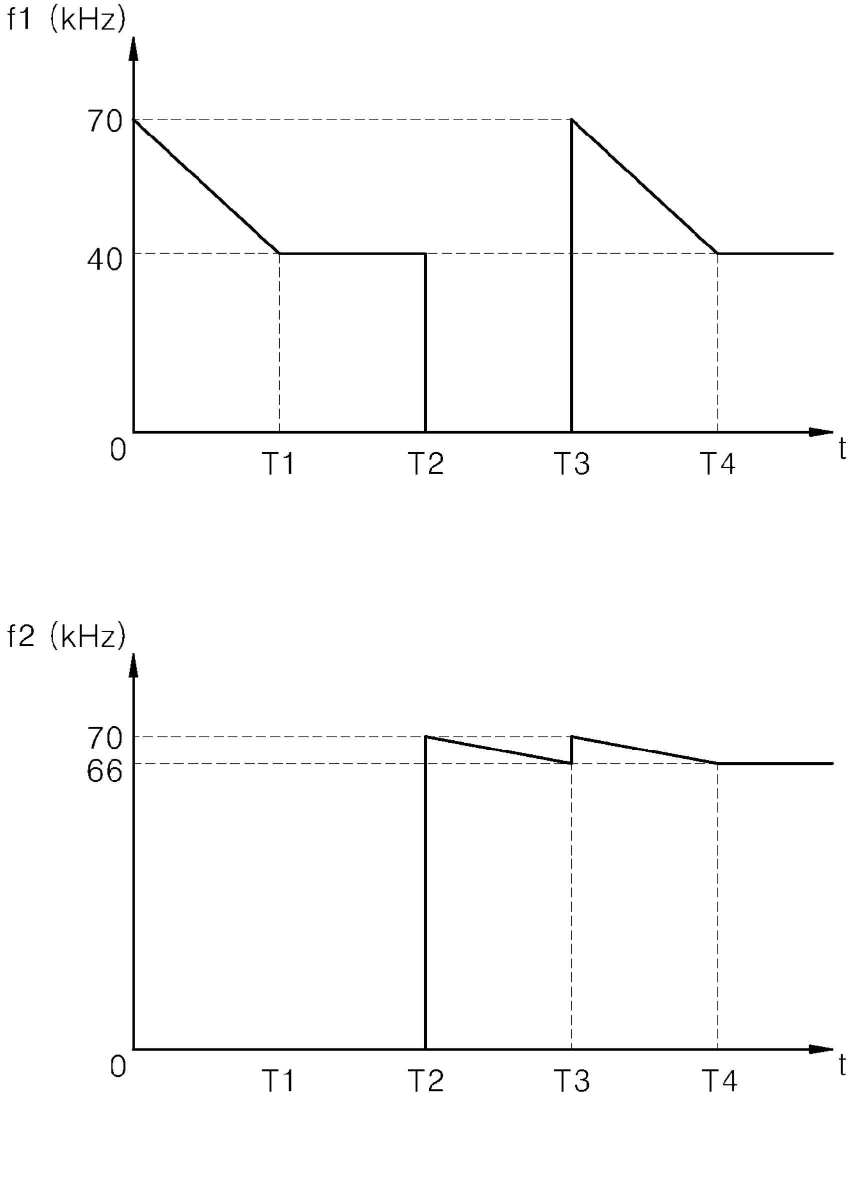

[Fig. 8]
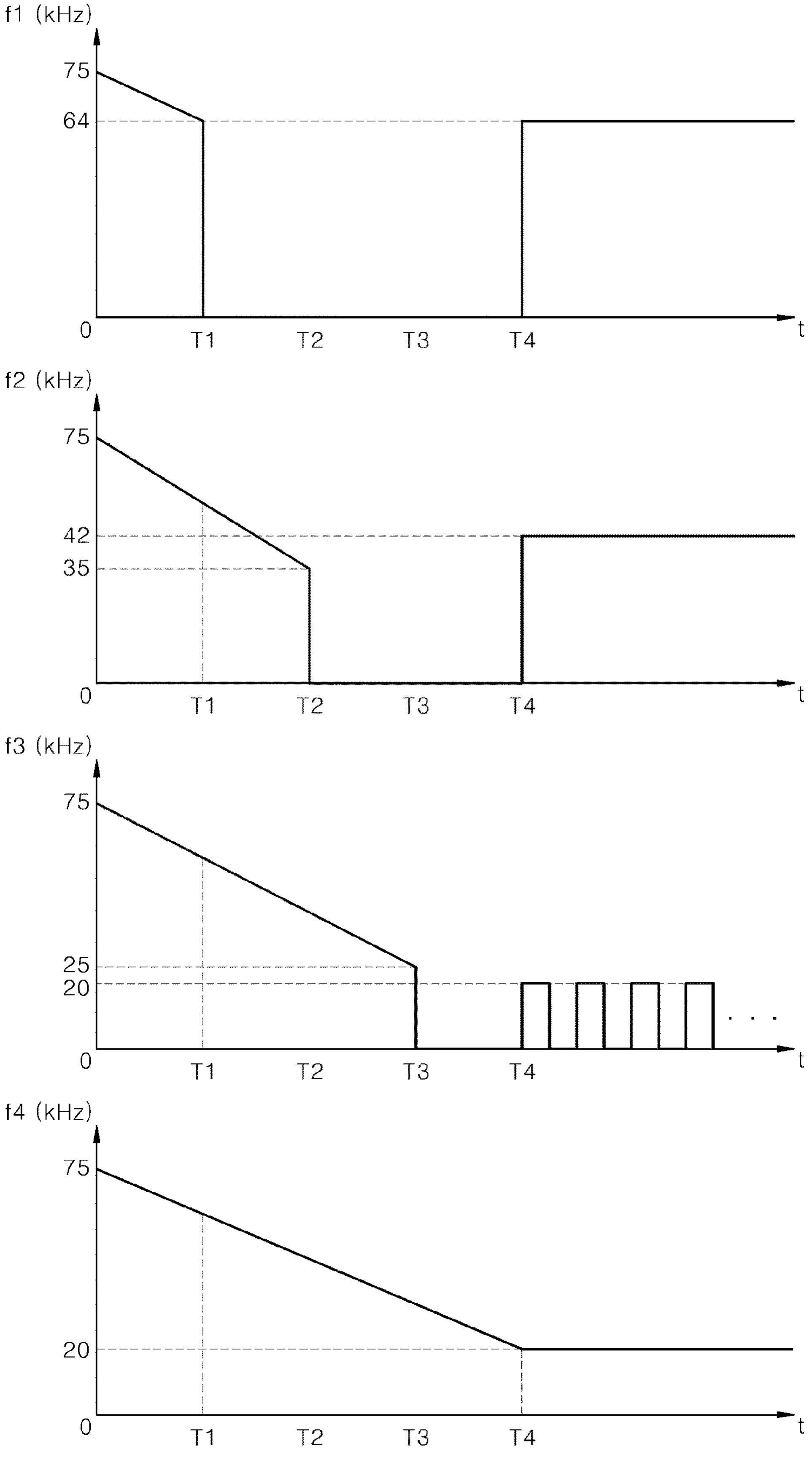

[Fig. 9]
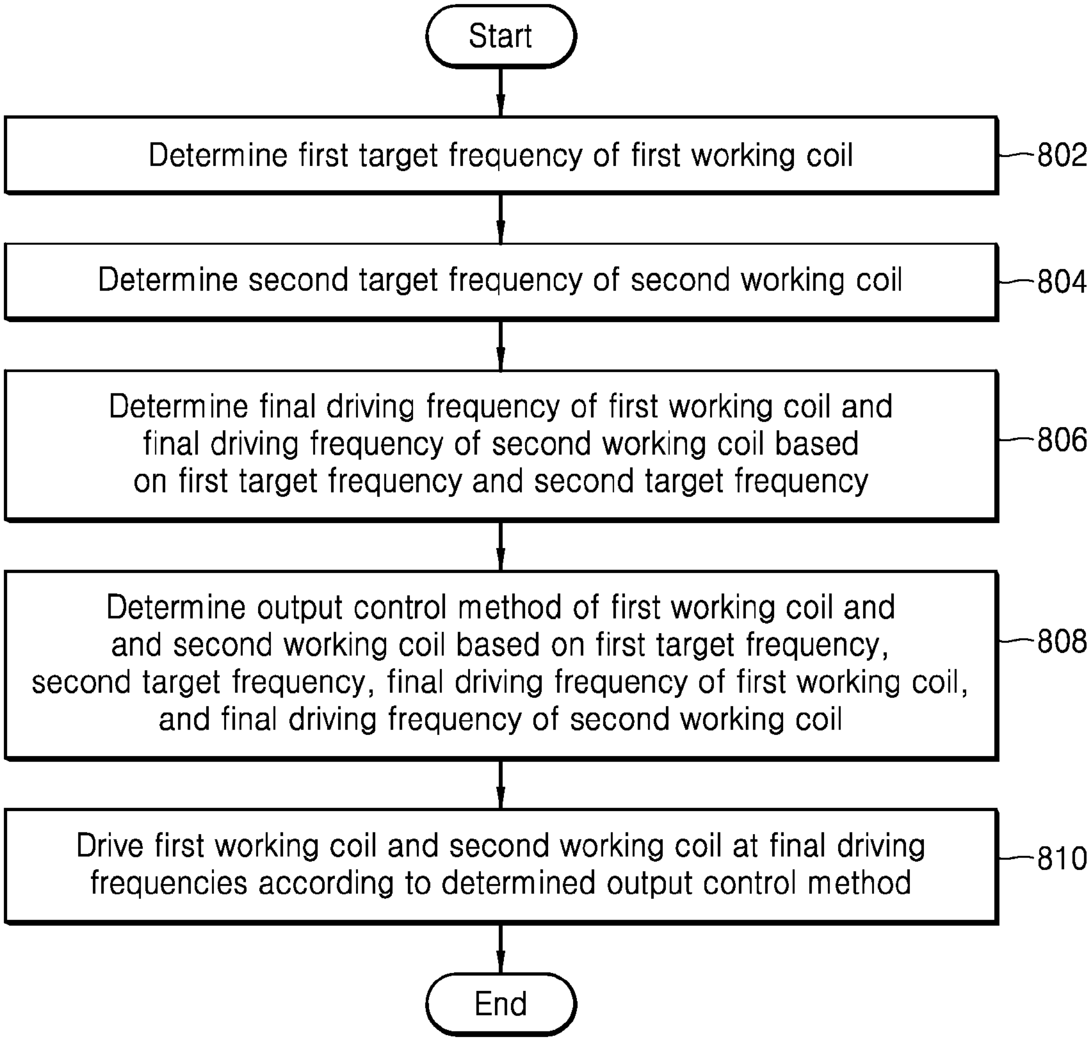

[Fig. 10]
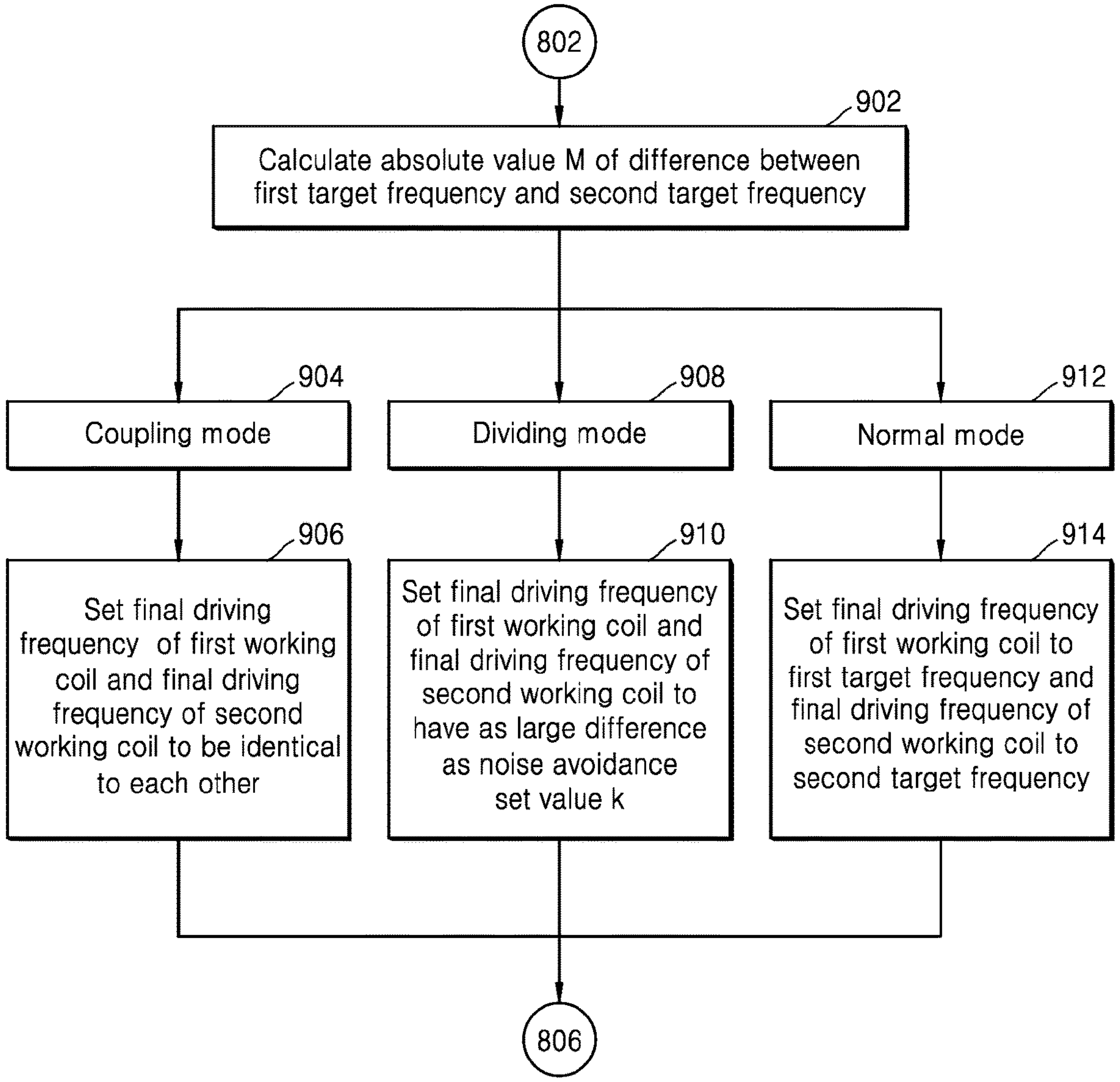

INDUCTION HEATING DEVICE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2019/011167, filed Aug. 30, 2019, which claims priority to U.S. Provisional Application No. 62/724,763, filed Aug. 30, 2018, whose entire disclosures are hereby incorporated by reference.

TECHNICAL FIELD

The disclosure relates to induction heating device and methods of controlling the same and, more specifically, to induction heating device capable of reducing interference noise created while a working coil is driven and methods of controlling the same.

BACKGROUND ART

Various kinds of cookers are used for heating food in homes or restaurants. Gas stoves which are fueled by combustion gas were conventionally commonplace, but in wide use are recently electric cookers.

Electric cookers come largely in two types: resistance heating and induction heating. Resistance heating heats a cooking vessel by way of thermal energy produced when electric energy is supplied to a metal resistance wire or non-metallic heating element of, e.g., silicon carbide. Induction heating allows eddy currents to flow through a metal vessel with magnetic fields around working coils produced when electrical energy is fed to the working coils, thereby heating the vessel.

More specifically, as power is fed to an induction heating device, a predetermined magnitude of high-frequency voltage is applied to the working coils and thus, magnetic fields are induced around the working coils which are placed inside the induction heating device. The magnetic field lines of the induced magnetic field pass through the metal bottom of the vessel on the working coils and eddy currents are produced inside the vessel bottom. The flow of the eddy currents heats the vessel.

The induction heating device may include two or more heating areas and two or more working coils corresponding to the heating areas. For example, upon cooking with an induction heating device with two heating areas, the user places vessels on the heating areas and supplies power to each of the two working coils. Each working coil is driven at a driving frequency corresponding to a required power value set by the user.

In this case, if the absolute value of the difference in driving frequency between the working coils falls within the hearing range (e.g., 2 kHz to 20 kHz), interference noise may occur as the working coils are driven. The interference noise may not only bother the user but also cast doubt on the normal operation of the induction heating device.

Various methods have been proposed to reduce interference noise in two or more working coils-equipped induction heating device. One way is to adjust the output power value of each heating area or the driving frequency of each working coil by controlling the driving of the power feeder for the working coils. For example, Korean Patent No. 10-1735754 discloses blocking interference noise by sequentially turning on/off switching elements connected to working coils in a time division scheme in an induction heating device with multiple working coils.

FIG. 1 is a graph illustrating a frequency control method for reducing interference noise in an induction heating device according to the prior art.

FIG. 1 illustrates a graph that represents variations in driving frequency as an induction heating device with two working coils operates. In FIG. 1, f1 denotes the driving frequency of the first working coil, and f2 denotes the driving frequency of the second working coil. t denotes the driving time of the induction heating device.

If the user sets a heating level for the first heating area and inputs a driving command to the first working coil, the first working coil is operated at a driving frequency (e.g., 30 kHz) corresponding to a required power value which corresponds to the set heating level.

When the first working coil is driven at a driving frequency of 30 kHz, the user may issue a driving command for the second working coil. If a driving command for the second working coil is input at time T1, the second working coil starts to be driven at a predetermined frequency (e.g., 70 kHz). When the second working coil starts to operate at time T1, the first working coil continues to run at the existing driving frequency (30 kHz).

Thereafter, the induction heating device reduces the driving frequency of the second working coil until the output power value of the second working coil reaches a required power value set by the user. When the driving frequency of the second working coil arrives at a target frequency (e.g., 30 kHz) corresponding to the required power value, the second working coil runs at 30 kHz after time T2.

According to the above process, after time T1 when the driving command is input to the second working coil, the first working coil and the second working coil may keep running to time T2. Between time T1 and time T2, the difference in driving frequency between the first working coil and the second working coil belongs to the hearing range (e.g., 2 kHz to 20 kHz). Thus, while the first working coil and the second working coil run between time T1 and time T2, interference noise may occur.

The interference noise issue is still present even when the difference between the target frequency of the second working coil determined in the above process and the existing driving frequency of the running first working coil falls within the hearing range (2 kHz to 15 kHz). For example, where the target frequency of the second working coil is determined to be 37 kHz while the target frequency of the first working coil is 30 kHz as shown in FIG. 1, the difference in driving frequency between the first working coil and the second working coil is 7 kHz which belongs to the hearing range and, thus, interference noise continues to occur.

DISCLOSURE OF INVENTION

Technical Problem

An object of the disclosure is to provide an induction heating device capable of reducing interference noise caused when two or more working coils are driven and a method of controlling the induction heating device.

Another object of the disclosure is to provide an induction heating device capable of allowing the output power of working coils to meet a required power value set by the user while reducing interference noise caused when two or more working coils run and a method of controlling the induction heating device.

The disclosure is not limited to the foregoing objectives, but other objects and advantages will be readily appreciated and apparent from the following detailed description of embodiments of the disclosure. It will also be appreciated that the objects and advantages of the disclosure may be achieved by the means shown in the claims and combinations thereof.

Solution to Problem

According to an embodiment of the disclosure, a method of controlling an induction heating device comprises determining a first target frequency of a first working coil corresponding to a driving command for the first working coil, determining a second target frequency of a second working coil corresponding to a driving command for the second working coil, determining a final driving frequency of the first working coil and a final driving frequency of the second working coil based on the first target frequency and the second target frequency, determining output control methods of the first working coil and the second working coil based on the first target frequency, the second target frequency, the final driving frequency of the first working coil, and the final driving frequency of the second working coil, and driving the first working coil and the second working coil at the final driving frequencies according to the output control methods.

According to an embodiment of the disclosure, determining the first target frequency of the first working coil includes driving the first working coil at a predetermined first adjustment frequency, reducing a driving frequency of the first working coil, and determining that the first target frequency is a driving frequency when an output power value of the first working coil matches a required power value corresponding to a driving command for the first working coil.

According to an embodiment of the disclosure, determining the second target frequency of the second working coil includes receiving a driving command for the second working coil when the first working coil is driven at the first target frequency, stopping driving the first working coil and driving the second working coil at a predetermined first adjustment frequency, reducing a driving frequency of the second working coil, and determining that the second target frequency is a driving frequency when an output power value of the second working coil matches a required power value corresponding to a driving command for the second working coil.

According to an embodiment of the disclosure, determining the final driving frequency of the first working coil and the final driving frequency of the second working coil includes calculating a difference between the first target frequency and the second target frequency and determining the final driving frequency of the first working coil and the final driving frequency of the second working coil according to a result of comparison between the difference and a predetermined reference value.

According to an embodiment of the disclosure, when the difference is not less than a predetermined first reference value and less than a predetermined second reference value, the final driving frequency of the first working coil and the final driving frequency of the second working coil are set to be identical to each other.

According to an embodiment of the disclosure, the final driving frequency of the first working coil and the final driving frequency of the second working coil are set to the larger value among the first target frequency and the second target frequency.

According to an embodiment of the disclosure, the final driving frequency of the first working coil and the final driving frequency of the second working coil are set to the smaller value among the first target frequency and the second target frequency.

According to an embodiment of the disclosure, when the difference is not less than a predetermined second reference value and less than a predetermined third reference value, the final driving frequency of the first working coil and the final driving frequency of the second working coil are set to have a difference not less than a predetermined noise avoidance set value.

According to an embodiment of the disclosure, the final driving frequency of the first working coil and the final driving frequency of the second working coil are set to a value resulting from increasing the larger value among the first target frequency and the second target frequency to a predetermined noise avoidance set value and the smaller value among the first target frequency and the second target frequency.

According to an embodiment of the disclosure, when the difference is less than a predetermined first reference value or not less than a predetermined third reference value, the final driving frequency of the first working coil is set to the first target frequency, and the final driving frequency of the second working coil is set to the second target frequency.

According to an embodiment of the disclosure, determining the output control methods of the first working coil and the second working coil includes determining that the respective output control methods of the first working coil and the second working coil are linear control methods.

According to an embodiment of the disclosure, determining the output control methods of the first working coil and the second working coil includes setting an output control method of a working coil whose final driving frequency is smaller than a target frequency to a duty control method and an output control method of a working coil whose final driving frequency is the same as a target frequency to a linear control method.

According to an embodiment of the disclosure, determining the output control methods of the first working coil and the second working coil includes determining that the respective output control methods of the first working coil and the second working coil are linear control methods.

According to an embodiment of the disclosure, an induction heating device comprises a first working coil corresponding to a first heating area, a second working coil corresponding to a second heating area, a controller configured to determine a driving frequency of the first working coil or the second working coil when a driving command for the first working coil or a driving command for the second working coil is input to drive the first working coil or the second working coil, wherein the controller is configured to determine a first target frequency of the first working coil corresponding to the driving command for the first working coil, determine a second target frequency of the second working coil corresponding to the driving command for the second working coil, determine a final driving frequency of the first working coil and a final driving frequency of the second working coil based on the first target frequency and the second target frequency, determine output control methods of the first working coil and the second working coil based on the first target frequency, the second target frequency, the final driving frequency of the first working coil, and the final driving frequency of the second working coil, and drive the first working coil and the second working coil at the final driving frequencies according to the output control methods.

According to an embodiment of the disclosure, the controller drives the first working coil at a predetermined first adjustment frequency, reduces a driving frequency of the first working coil, and determines that the first target frequency is a driving frequency when an output power value of the first working coil matches a required power value corresponding to the driving command for the first working coil.

According to an embodiment of the disclosure, the controller receives the driving command for the second working coil when the first working coil is driven at the first target frequency, stops driving the first working coil and drive the second working coil at a predetermined first adjustment frequency, reduces a driving frequency of the second working coil, and determine that the second target frequency is a driving frequency when an output power value of the second working coil matches a required power value corresponding to the driving command for the second working coil.

According to an embodiment of the disclosure, the controller calculates a difference between the first target frequency and the second target frequency and determines the final driving frequency of the first working coil and the final driving frequency of the second working coil according to a result of comparison between the difference and a predetermined reference value.

According to an embodiment of the disclosure, when the difference is not less than a predetermined first reference value and less than a predetermined second reference value, the final driving frequency of the first working coil and the final driving frequency of the second working coil are set to be identical to each other.

According to an embodiment of the disclosure, the final driving frequency of the first working coil and the final driving frequency of the second working coil are set to the larger value among the first target frequency and the second target frequency.

According to an embodiment of the disclosure, the final driving frequency of the first working coil and the final driving frequency of the second working coil are set to the smaller value among the first target frequency and the second target frequency.

According to an embodiment of the disclosure, when the difference is not less than a predetermined second reference value and less than a predetermined third reference value, the final driving frequency of the first working coil and the final driving frequency of the second working coil are set to have a difference not less than a predetermined noise avoidance set value.

According to an embodiment of the disclosure, the final driving frequency of the first working coil and the final driving frequency of the second working coil are set to a value resulting from increasing the larger value among the first target frequency and the second target frequency to a predetermined noise avoidance set value and the smaller value among the first target frequency and the second target frequency.

According to an embodiment of the disclosure, when the difference is less than a predetermined first reference value or not less than a predetermined third reference value, the final driving frequency of the first working coil is set to the first target frequency, and the final driving frequency of the second working coil is set to the second target frequency.

According to an embodiment of the disclosure, the controller determines that the respective output control methods of the first working coil and the second working coil are linear control methods.

According to an embodiment of the disclosure, the controller sets an output control method of a working coil whose final driving frequency is smaller than a target frequency to a duty control method and an output control method of a working coil whose final driving frequency is the same as a target frequency to a linear control method.

According to an embodiment of the disclosure, the controller determines that the respective output control methods of the first working coil and the second working coil are linear control methods.

Advantageous Effects of Invention

The interference noise which occurs when two or more working coils in an induction heating device perform heating may be reduced by the present disclosure.

The induction heating device according to the present disclosure may allow the output power of working coils to meet a required power value set by the user while reducing interference noise caused when two or more working coils run.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a graph illustrating a frequency control method for reducing interference noise in an induction heating device according to the prior art;

FIG. 2 is a perspective view illustrating an induction heating device according to an embodiment of the disclosure;

FIG. 3 is a circuit diagram illustrating working coils and a power supply module of an induction heating device according to an embodiment of the disclosure;

FIG. 4 is a graph illustrating a process of controlling the driving frequency of a first working coil and a second working coil when an induction heating device is driven in a power coupling mode according to an embodiment of the disclosure;

FIG. 5 is a graph illustrating a process of controlling the driving frequency of a first working coil and a second working coil when an induction heating device is driven in a normal coupling mode according to an embodiment of the disclosure;

FIG. 6 is a graph illustrating a process of controlling the driving frequency of a first working coil and a second working coil when an induction heating device is driven in a dividing mode according to an embodiment of the disclosure;

FIG. 7 is a graph illustrating a process of controlling the driving frequency of a first working coil and a second working coil when an induction heating device is driven in a normal mode according to an embodiment of the disclosure;

FIG. 8 is a graph illustrating a process of controlling the driving frequency of each working coil when an induction heating device with a first working coil to a fourth working coil is driven according to an embodiment of the disclosure;

FIG. 9 is a flowchart illustrating a method of controlling an induction heating device according to an embodiment of the disclosure; and FIG. 10 is a flowchart illustrating a method of setting final driving frequencies of a first working coil and a second working coil according to an embodiment of the disclosure.

MODE FOR THE INVENTION

The foregoing objectives, features, and advantages are described below in detail with reference to the accompanying drawings so that the technical spirit of the disclosure may easily be achieved by one of ordinary skill in the art to which the invention pertains. When determined to make the subject matter of the disclosure unclear, the detailed description of the known art or functions may be skipped. Hereinafter, preferred embodiments of the disclosure are described in detail with reference to the accompanying drawings. The same reference denotations are used to refer to the same or similar elements throughout the drawings.

FIG. 2 is a perspective view illustrating an induction heating device according to an embodiment of the disclosure.

Referring to FIG. 2, according to an embodiment of the disclosure, an induction heating device 10 includes a case 102 forming an outer appearance of the induction heating device 10 and a cover plate 110 coupled with the case 102 to seal the case 102.

The bottom of the cover plate 110 may be coupled to the top of the case 102 to seal the internal space of the case 102 off the outside. A top plate part 106 is formed on the top of the cover plate 110 to place a heated object, e.g., a cooking vessel, thereon. The top plate part 106 may be formed of various materials, e.g., ceramic glass or other reinforced glass.

Working coils 102, 104, 106*a*, and 106*b* for heating vessels are placed in the internal space of the case 102, which is formed as the cover plate 110 and the case 102 are coupled together. Specifically, a first working coil 102, a second working coil 104, and third working coils 106*a* and 106*b* are placed in the inside of the case 102.

The first working coil 102, the second working coil 104, and the third working coils 106*a* and 106*b* each are formed by winding a wire of copper or other electric conductor several times. Referring to FIG. 2, the first working coil 102 and the second working coil 104 each may be shaped as a rectangle with rounded corners, and the third working coils 106*a* and 106*b* each may be shaped as a circle. However, the shape of each working coil may be varied according to embodiments.

The number and arrangement of the working coils placed in the induction heating device may be varied according to embodiments.

According to an embodiment of the disclosure, the third working coils 106*a* and 106*b* may include two coils, e.g., an inner coil 106*a* and an outer coil 106*b*. Although FIG. 2 illustrates an embodiment in which the third working coils 106*a* and 106*b* include two coils, the number of the third working coils or the number of inner coils or the number of outer coils may be varied according to embodiments.

For example, the third working coils may include four coils. In such a case, among the third working coils, two coils placed inside may be defined as inner coils, and the other two coils placed outside may be defined as outer coils. As another example, among the third working coils, three coils placed inside may be defined as inner coils, and the other one coil placed outside may be defined as an outer coil.

A first heating area 142, a second heating area 144, and a third heating area 146 are displayed on the surface of the top plate part 106 of the cover plate 110. The respective positions of the first heating area 142, the second heating area 144, and the third heating area 146 respectively correspond to the respective positions of the first working coil 102, the second working coil 104, and the third working coils 106*a* and 106*b*.

In the internal space of the case 102 is provided an interface unit 108 with the functionality of allowing the user to apply power, adjust the output of the working coils 102, 104, 106*a*, and 106*b*, or display information related to the induction heating device 10. Although the description focuses primarily on embodiments in which the interface unit 108 is implemented as a touch panel capable of both inputting information and displaying information by touch, the interface unit 108 may also be implemented in other forms or structures according to embodiments.

A control area 118 is formed on the top plate part 106 of the cover plate 110 in a position corresponding to the interface unit 108. Particular characters or images for the user's control or information display may be displayed on the control area 118. The user may control (e.g., touch) a particular point of the control area 118 by referring to characters or image displayed on the control area 118, thereby performing her desired control. For example, the user may input a driving command for the working coil corresponding to each heating area by setting touching the control area 118 to thereby setting a heating level for the vessel placed on at least one of the first heating area 142, the second heating area 144, and the third heating area 146. Various pieces of information, which are output by the interface unit 108 as controlled by the user or operated by the induction heating device 10, may be displayed through the control area 118.

Inside the case 102 is a power supply module (not shown) for supplying power to the working coils 102, 104, 106*a*, and 106*b* or the interface unit 108. The power supply module is electrically connected with the working coils 102, 104, 106*a*, and 106*b* or the interface unit 108 and converts power applied from an external power source to power appropriate for driving the working coils 102, 104, 106*a*, and 106*b* or the interface unit 108 and supplies the converted power.

FIG. 2 illustrates an embodiment in which three working coils 102, 104, 106*a*, and 106*b* are placed in the internal space of the case 102. However, according to another embodiment of the disclosure, one working coil may be placed in the internal space of the case 102 or four or more working coils may be placed in the internal space of the case 102.

Although not shown in FIG. 2, a controller (not shown) may be placed in the internal space of the case 102. The controller (not shown) controls the driving of the working coils 102, 104, 106*a*, and 106*b* according the user's command (e.g., a driving start command, driving end command, or heating level adjusting command) input through the interface unit 108.

The user may place a vessel on her desired one of the first heating area 142, the second heating area 144, and the third heating area 146 and then set a heating level for the heating area on which the vessel is placed and issue a heating command through the control area 118.

The user's heating command input through the control area 118, as a driving command for the working coil corresponding to the heating area where the vessel is seated by the user, is input to the controller (not shown). Receiving the driving command, the controller (not shown) drives the working coil, which the driving command targets, thereby heating the vessel.

FIG. 3 is a circuit diagram illustrating working coils and a power supply module of an induction heating device according to an embodiment of the disclosure.

In the circuit diagram of FIG. 3, an induction heating device includes two working coils, e.g., a first working coil 102 and a second working coil 104 according to an embodiment of the disclosure. However, as set forth above, according to an embodiment of the disclosure, the induction heating device may include two or more working coils, and the method of controlling the induction heating device described below may apply likewise to induction heating device with two or more working coils.

Referring to FIG. 3, according to an embodiment of the disclosure, the induction heating device includes two heating modules, e.g., a first heating module 202 and a second heating module 204. The first heating module 202 and the second heating module 204 convert alternating current (AC) power, which is supplied from an external power source 30, and supply driving power to each of the first working coil 102 and the second working coil 104.

The first heating module 202 includes a rectifying unit 302 and a smoothing unit 304.

The rectifying unit 302 rectifies AC voltage supplied from the external power source 30 and outputs the rectified voltage. The smoothing unit 304 includes a first inductor L1 and a first capacitor C1. The smoothing unit 304 converts the rectified voltage, which is output from the rectifying unit 302, into direct current (DC) voltage and outputs the DC voltage.

The second heating module 204 includes a rectifying unit 306 and a smoothing unit 308. The rectifying unit 306 rectifies AC voltage supplied from the external power source 30 and outputs the rectified voltage. The smoothing unit 308 includes a second inductor L2 and a fourth capacitor C4. The smoothing unit 308 converts the rectified voltage, which is output from the rectifying unit 306, into DC voltage and outputs the DC voltage.

The first heating module 202 includes a plurality of switching elements SW1 and SW2 and a plurality of capacitors C2 and C3.

A first switching element SW1 and a second switching element SW2 are connected together in series and are alternately turned on and off by a first switching signal S1 and a second switching signal S2 output from a first driving unit 34. According to an embodiment, the turn-on and turn-off operations of the switching elements are denoted 'switching operations.'

The second capacitor C2 and the third capacitor C3 are connected together in series. The first switching element SW1 is connected in parallel with the second capacitor C2, and the second switching element SW2 is connected in parallel with the third capacitor C3.

The first working coil 102 is connected between the connection node of the first switching element SW1 and the second switching element SW2 and the connection node of the second capacitor C2 and the third capacitor C3. If a first switching signal S1 and a second switching signal S2 are applied to the first switching element SW1 and the second switching element SW2, respectively, so that the first switching element SW1 and the second switching element SW2 perform switching operations, an AC current is supplied to the first working coil 102 and induction heating is performed on the vessel.

The second heating module 204 includes a plurality of switching elements SW3 and SW4 and a plurality of capacitors C5 and C6.

A third switching element SW3 and a fourth switching element SW4 are connected together in series and are alternately turned on and off by a third switching signal S3 and a fourth switching signal S4 output from a second driving unit 36.

The fifth capacitor C5 and the sixth capacitor C6 are connected together in series. The third switching element SW3 is connected in parallel with the fifth capacitor C5, and the fourth switching element SW4 is connected in parallel with the sixth capacitor C6.

The second working coil 104 is connected between the connection node of the third switching element SW3 and the fourth switching element SW4 and the connection node of the fifth capacitor C5 and the sixth capacitor C6. If a third switching signal S3 and a fourth switching signal S4 are applied to the third switching element SW3 and the fourth switching element SW4, respectively, so that the third switching element SW3 and the fourth switching element SW4 perform switching operations, an AC current is supplied to the second working coil 104 and induction heating is performed on the vessel.

The first driving unit 34 applies the first switching signal S1 and the second switching signal S2 to the first switching element SW1 and the second switching element SW2, respectively, of the first heating module 202. The second driving unit 36 applies the third switching signal S3 and the fourth switching signal S4 to the third switching element SW3 and the fourth switching element SW4, respectively, of the second heating module 204. According to an embodiment of the disclosure, the first switching signal S1, the second switching signal S2, the third switching signal S3, and the fourth switching signal S4, each, are a pulse width modulation (PWM) signal. The duty ratio of the first switching signal S1 and the second switching signal S2 is determined depending on the driving frequency of the first working coil 102, and the duty ratio of the third switching signal S3 and the fourth switching signal S4 is determined depending on the driving frequency of the second working coil 104.

A controller 32 determines the driving frequency of the first working coil 102 and the driving frequency of the second working coil 104 and outputs control signals corresponding to the determined driving frequencies. The controller 32 independently supplies control signals to the first driving unit 34 and the second driving unit 36. As the controller 32 adjusts the driving frequencies, the magnitude of power which the first working coil 102 or the second working coil 104 outputs, e.g., output power value, is varied.

Voltage detecting units 212 and 222 measure the magnitude of voltages, which are input to the heating modules 202 and 204, simply 'input voltage magnitudes'. Current detecting units 214 and 224 measure the magnitude of currents, which are input to the first working coil 102 and the second working coil 104, simply 'input current magnitudes.'

The controller 32 receives the input voltage magnitudes from the voltage detecting units 212 and 222 and the input current magnitudes from the current detecting units 214 and 224. The controller 32 may calculate the output power values of the first working coil 102 and the second working coil 104 using the received input voltage and input current magnitudes, e.g., power values supplied to the vessels by the first working coil 102 and the second working coil 104. When the first working coil 102 and the second working coil

104 are driven, the controller 32 may calculate, in real-time, the output power value of each working coil using various known methods.

The user may place a vessel on her desired heating area and then set a heating level for the vessel-placed heating area and issue a heating command for the vessel through the control area 118. The user's heating command input through the control area 118, as a driving command for the working coil corresponding to the vessel-placed heating area, is input to the controller 32. Receiving the driving command, the controller 32 drives the working coil, which the driving command targets, thereby heating the vessel.

Where only one working coil is driven, the above-described interference noise issue does not occur. However, if one working coil is running while the user inputs a driving command for another working coil, interference noise may be caused depending on the magnitude of driving frequency of each working coil.

According to an embodiment, where the user inputs a driving command for one working coil, with another working coil running, the controller 32 of the induction heating device determines a target frequency of each working coil and performs frequency control for reducing interference noise based on the determined target frequency of each working coil.

Here, 'target frequency of each working coil' means the driving frequency of the working coil when the output power value of the working coil reaches a power value, e.g., a required power value, corresponding to a heating level set by the user. For example, if the user sets the heating level of the first heating area to 5, the required power value of the first working coil 102 corresponding to the first heating area may be determined to be 4,000 W. When the first working coil 102 is driven so that a power value of 4,000 W is output, the driving frequency (e.g., 40 kHz) of the first working coil 102 may be defined as the target frequency of the first working coil 102.

According to an embodiment, where the second working coil 104 is requested to run while the first working coil 102 is running at a first target frequency, the controller 32 of the induction heating device determines a second target frequency of the second working coil 104. The controller 32 determines a driving mode (normal coupling mode, power coupling mode, dividing mode, or normal mode) of the induction heating device based on the determined first target frequency and second target frequency.

The controller 32 determines final driving frequencies of the first working coil 102 and the second working coil 104 based on the determined driving mode. The controller 32 drives each working coil based on the determined final driving frequencies. If the first working coil 102 and the second working coil 104 are driven at their respective final driving frequencies, interface noise which may occur when two working coils are simultaneously drive is reduced as compared with the prior art.

A frequency control method for reducing interference noise in an induction heating device is described below in detail with reference to the drawings according to an embodiment of the disclosure. In FIGS. 4 to 8, f1 and f2, respectively, denote the driving frequency of the first working coil 102 and the driving frequency of the second working coil 104. t denotes the driving time of each working coil.

FIG. 4 is a graph illustrating a process of controlling the driving frequency of a first working coil and a second working coil when an induction heating device is driven in a coupling mode according to an embodiment of the disclosure. FIG. 5 is a graph illustrating a process of controlling the driving frequency of a first working coil and a second working coil when an induction heating device is driven in a normal coupling mode according to an embodiment of the disclosure. FIG. 6 is a graph illustrating a process of controlling the driving frequency of a first working coil and a second working coil when an induction heating device is driven in a dividing mode according to an embodiment of the disclosure. FIG. 7 is a graph illustrating a process of controlling the driving frequency of a first working coil and a second working coil when an induction heating device is driven in a normal mode according to an embodiment of the disclosure.

Referring to FIGS. 4 to 7, while the second working coil 104 is not yet driven, the user places a vessel on the first heating area and sets a heating level for the first heating area. Thus, a driving command for the first working coil 102 is input to the controller 32.

Receiving the driving command for the first working coil 102, the controller 32 drives the first working coil 102 at a predetermined first adjustment frequency (e.g., 70 kHz). According to an embodiment, the magnitude of the first adjustment frequency may be set to differ according to embodiments. As shown in FIGS. 4 to 7, at time 0, the first working coil 102 starts to run at a first adjustment frequency of 70 kHz.

The controller 32 reduces the driving frequency of the first working coil 102 while measuring the output power value of the first working coil 102 so that the first working coil 102 may supply the same power as the required power value corresponding to the heating level set by the user for the first working coil 102.

For example, in the period between time 0 and time T1 as shown in FIGS. 4 to 7, the controller 32 gradually reduces the driving frequency of the first working coil 102 from the first adjustment frequency, e.g., 70 kHz, while measuring the output power value of the first working coil 102. At this time, the output power value of the first working coil 102 may be calculated based on an input voltage value transferred from the voltage detecting unit 212 and an input current value transferred from the current detecting unit 214.

The controller 32 determines that the first target frequency of the first working coil 102 is the frequency (e.g., 40 kHz) at time T1 when the output power value of the first working coil 102, measured while reducing the driving frequency of the first working coil 102, matches the required power value. Thus, the first working coil 102 is driven at the first target frequency (40 kHz).

According to an embodiment, the controller 32 may determine the first target frequency corresponding to the driving command of the first working coil 102 by referring to a table recording the target frequency corresponding to the heating level set by the user for the first working coil 102.

When the first working coil 102 is running at the first target frequency, the user places a vessel on the second heating area and sets a heating level for the second heating area. Accordingly, the controller 32 receives a driving command for the second working coil 104. If the driving command for the second working coil 104 is received, the controller 32 stops driving the first working coil 102 at time T2 so as to determine a target frequency (second target frequency) of the second working coil 104.

At time T2, the controller 32 stops driving the first working coil 102 while simultaneously driving the second working coil 104 at the first adjustment frequency (70 kHz). According to an embodiment, the second working coil 104 may be driven at the first adjustment frequency a predetermined time after the first working coil 102 stops running.

As such, according to an embodiment, where the second working coil 104 is requested to be driven while the first working coil 102 is running, the driving of the first working coil 102 is temporarily stopped to discover the target frequency of the second working coil 104. Thus, the driving frequency of the first working coil 102 becomes zero during the period T2 to T3 when the target frequency of the second working coil 104 is discovered. Such control prevents interference noise by the first working coil 102 and the second working coil 104 during the period T2 to T3 when the target frequency of the second working coil 104 is discovered.

The controller 32 calculates the output power value of the second working coil 104 while gradually reducing the driving frequency of the second working coil 104 in the same manner as discovering the target frequency of the first working coil 102. If the output power value of the second working coil 104 matches the required power value for the second working coil 104 at time T3, the controller 32 determines that the frequency (43 kHz) at time T3 is the second target frequency of the second working coil 104.

According to an embodiment, the controller 32 may determine the second target frequency corresponding to the driving command of the second working coil 104 by referring to a table recording the target frequency corresponding to the heating level set by the user for the second working coil 104.

As set forth above, at time T3 when the second target frequency of the second working coil 104 is determined, the controller 32 compares the respective target frequencies of the working coils, rather than immediately driving the first working coil 102 and the second working coil 104 at their respective target frequencies. According to the result of comparison, the controller 32 determines one of the normal coupling mode, power coupling mode, dividing mode, and normal mode as the driving mode of the induction heating device.

Specifically, the controller 32 calculates the absolute value M of the difference between the first target frequency of the first working coil 102 and the second target frequency of the second working coil 104. The controller 32 compares the calculated absolute value M of the difference with a predetermined reference value, thereby determining the driving mode.

If the calculated absolute value M of the difference is not less than a predetermined first reference value and less than a predetermined second reference value, the controller 32 determines that the coupling mode is the driving mode of the induction heating device. In the coupling mode, the controller 32 sets the final driving frequency of the first working coil 102 and the final driving frequency of the second working coil 104 to be identical to each other.

For example, where the first target frequency of the first working coil 102 is determined to be 40 kHz at time T1 and the second target frequency of the second working coil 104 is determined to be 43 kHz at time T3 as in the embodiment of FIG. 4, the controller 32 calculates the difference (43−40=3 kHz) between the two target frequencies. Where the first reference value and the second reference value are determined to be 2 kHz and 8 kHz, respectively, the absolute value M of the difference is not less than the first reference value and less than the second reference value. Thus, the controller 32 determines that the driving mode of the induction heating device is the coupling mode (normal coupling mode or power coupling mode).

If the driving mode of the induction heating device is determined to be the power coupling mode, the controller 32 determines that the final driving frequency of the first working coil 102 and the final driving frequency of the second working coil 104 are the smaller (40 kHz) of the first target frequency (40 kHz) of the first working coil 102 and the second target frequency (43 kHz) of the second working coil 104, as shown in FIG. 4.

If the driving mode of the induction heating device is determined to be the normal coupling mode, the controller 32 determines that the final driving frequency of the first working coil 102 and the final driving frequency of the second working coil 104 are the larger (43 kHz) of the first target frequency (43 kHz) of the first working coil 102 and the second target frequency (43 kHz) of the second working coil 104, as shown in FIG. 5.

As such, according to an embodiment, if the difference between the first target frequency of the first working coil 102 and the second target frequency of the second working coil 104 is not less than the first reference value and less than the second reference value, it may be possible to prevent interference noise due to the difference in driving frequency between the two working coils by matching the final driving frequencies of the two working coils.

According to another embodiment of the disclosure, when the driving mode of the induction heating device is the coupling mode, the controller 32 may set the final driving frequencies of the two working coils to a different value (e.g., the mean of the target frequencies of the two working coils or any value as arbitrarily set).

Meanwhile, if the absolute value M of the difference between the first target frequency of the first working coil 102 and the second target frequency of the second working coil 104 is not less than the predetermined second reference value and less than a predetermined third reference value, the controller 32 determines that the dividing mode is the driving mode of the induction heating device. In the dividing mode, the controller 32 sets the final driving frequency of the first working coil 102 and the final driving frequency of the second working coil 104 so that the difference between the final driving frequency of the first working coil 102 and the final driving frequency of the second working coil 104 is a predetermined noise avoidance set value k.

For example, where the first target frequency of the first working coil 102 is determined to be 40 kHz at time T1 and the second target frequency of the second working coil 104 is determined to be 50 kHz at time T3 as in the embodiment of FIG. 6, the controller 32 calculates the absolute value (50−40=10 kHz) of the difference between the two target frequencies. Where the second reference value and the third reference value are determined to be 8 kHz and 20 kHz, respectively, the absolute value M of the difference is not less than the second reference value and less than the third reference value. Thus, the controller 32 determines that the driving mode of the induction heating device is the dividing mode.

If the driving mode of the induction heating device is determined to be the dividing mode, the controller 32 sets the final driving frequency of the first working coil 102 to the same frequency, e.g., 40 kHz, as the first target frequency. The controller 32 sets the final driving frequency of the second working coil 104 to 62 kHz which is the sum of the final driving frequency of the first working coil 102, e.g., 40 kHz, and the predetermined noise avoidance set value k, e.g., 22 kHz. Here, the noise avoidance set value k may be set to a different value (e.g., 25 kHz) according to an embodiment.

As such, according to an embodiment, if the absolute value M of the difference between the first target frequency of the first working coil 102 and the second target frequency of the second working coil 104 is not less than the second reference value and less than the third reference value, the respective final driving frequencies of the working coils are set to have as large a difference as the predetermined noise avoidance set value k. Such control allows the difference (22 kHz) in driving frequency between the two working coils to depart from the hearing range (e.g., 2 kHz to 20 kHz), thereby reducing interference noise due to the driving of the working coils.

According to another embodiment of the disclosure, the controller 32 may set the final driving frequency of the first working coil 102 to a value (e.g., 36 kHz) less than the first target frequency (40 kHz) and the final driving frequency of the second working coil 104 to a noise avoidance set value (k) more value (e.g., 58 kHz) than the final driving frequency of the first working coil 102.

According to still another embodiment, the controller 32 may set the final driving frequency of the first working coil 102 to a noise avoidance set value (k) less value (e.g., 18 kHz) than the first target frequency (40 kHz) and the final driving frequency of the second working coil 104 to the same value as the second target frequency (50 kHz).

Meanwhile, if the absolute value M of the difference between the first target frequency of the first working coil 102 and the second target frequency of the second working coil 104 is less than the first reference value or not less than the third reference value, the controller 32 determines that the normal mode is the driving mode of the induction heating device. If the calculated absolute value M of the difference is less than the first reference value or not less than the third reference value, the absolute value of the difference between the first target frequency of the first working coil 102 and the second target frequency of the second working coil 104 departs from the hearing range (e.g., 2 kHz to 20 kHz). Thus, if the driving mode of the induction heating device is determined to be the normal mode, the controller 32 determines that the first target frequency of the first working coil 102 is the final driving frequency of the first working coil 102 and that the second target frequency of the second working coil 104 is the final driving frequency of the second working coil 104.

For example, where the first target frequency of the first working coil 102 is determined to be 40 kHz, and the second target frequency of the second working coil 104 is determined to be 66 kHz at time T3 as in the embodiment of FIG. 7, the controller 32 calculates the absolute value (66−40=26 kHz) of the difference between the two target frequencies. Since the calculated absolute value (26 kHz) of the difference is not less than the third reference value (20 kHz), the controller 32 sets the final driving frequency of the first working coil 102 to 40 kHz and the final driving frequency of the second working coil 104 to 66 kHz.

If the final driving frequencies of the first working coil 102 and the second working coil 104 are determined according to the above-described process, the controller 32 determines a method of controlling the output of the first working coil 102 and the second working coil 104 based on the first target frequency, the second target frequency, the final driving frequency of the first working coil 102, and the final driving frequency of the second working coil 104.

When the driving mode of the induction heating device is the power coupling mode as in the embodiment of FIG. 4, the controller 32 sets an output control method of a working coil whose final driving frequency is smaller than a target frequency to a duty control method and an output control method of a working coil whose final driving frequency is the same as a target frequency to a linear control method.

For example, in the embodiment of FIG. 4, the final driving frequency of the first working coil 102 and the final driving frequency of the second working coil 104 are set to the same value, e.g., 40 kHz. Accordingly, the controller 32 sets the output control method of the second working coil 104 whose final driving frequency (40 kHz) has been set to be smaller than the target frequency (43 kHz) to a duty control method. The controller 32 sets the output control method of the first working coil 102 whose final driving frequency (40 kHz) is the same as the target frequency (40 kHz) to a linear control method.

According to an embodiment, duty control method means that a working coil is driven so that the period P1 (on duty) during which the working coil is driven at the final driving frequency (40 kHz) and the period P2 (off duty) during which the working coil stops being driven are repeated within one period P as in the driving frequency (f2) waveform of the second working coil 104, as shown, after time T4 of FIG. 4. At this time, the duty ratio of the duty control method, e.g., the proportion of on duty (or off duty) in one period P, may be set to differ according to embodiments.

According to an embodiment, linear control method means that a working coil is continuously driven at the final driving frequency as in the driving frequency (f1) waveform of the first working coil 102, as shown, after time T4 of FIG. 4.

In the embodiment of FIG. 4, the target frequency of the second working coil 104 is 43 kHz, but the final driving frequency of the second working coil 104 is set to 40 kHz which is smaller than 43 kHz. Accordingly, where the second working coil 104 is driven at 40 kHz, such an issue may arise where larger power than the required power value corresponding to the heating level set by the user is supplied to the vessel. To address such issue, according to an embodiment, the output control method of the second working coil 104 is set to the duty control method as shown in FIG. 4. Thus, the magnitude of power supplied to the vessel when the second working coil 104 is finally driven becomes smaller than the magnitude of power supplied to the vessel when the second working coil 104 is continuously driven at 40 kHz.

According to an embodiment of the disclosure, the controller 32 receives the input voltage magnitudes from the voltage detecting units 212 and 222 and the input current magnitudes from the current detecting units 214 and 224 while performing duty control on the second working coil 104. The controller 32 may calculate the power value, e.g., output power value, supplied to the vessel by the second working coil 104 which is duty-controlled with the received input voltage and input current magnitudes. The controller 32 adjusts the duty ratio based on the calculated output power value of the second working coil 104 and may adjust the output power value of the second working coil 104 to be the same as the required power value set by the user.

Meanwhile, when the driving mode of the induction heating device is the normal coupling mode as in the embodiment of FIG. 5, the controller 32 sets both the output control methods of the two working coils to the linear control method. When the driving mode of the induction heating device is the normal coupling mode, the output power value of the first working coil 102 is the same as the required power value set by the user, and the output power value of the second working coil 104 is slightly lower than the required power value set by the user. Thus, there is no need for adjusting the output power values of the two working coils.

Further, if the final driving frequency of the first working coil 102 is set to differ from the final driving frequency of the second working coil 104, the controller 32 sets both the output control methods of the working coils to the linear control method.

For example, if the final driving frequency of the first working coil 102 is set to differ from the final driving frequency of the second working coil 104 as in the embodiment of FIG. 6 or 7, the respective output control methods of the first working coil 102 and the second working coil 104 are determined to be the linear control method. Thus, after time T4, the first working coil 102 and the second working coil 104 are continuously driven at the final driving frequency as shown in FIGS. 6 and 7.

As set forth above, if the output control method of each working coil is determined, the controller 32 simultaneously drives the first working coil 102 and the second working coil 104 at the second adjustment frequency.

For example, at time T3, the first working coil 102 and the second working coil 104 both are simultaneously driven at the second adjustment frequency as shown in FIGS. 4 to 7. As such, according to an embodiment, after the second target frequency of the second working coil 104 is determined, the final driving frequencies of the first working coil 102 and the second working coil 104 are determined and, when the first working coil 102 and the second working coil 104 are driven, the first working coil 102 and the second working coil 104 are simultaneously driven at the same frequency, e.g., the second adjustment frequency.

According to an embodiment, the operation in which the first working coil 102 and the second working coil 104 are simultaneously driven at the second adjustment frequency after the final driving frequencies are determined is denoted a “soft start” operation. According to an embodiment, the second adjustment frequency may be set to be the same or different from the first adjustment frequency.

At time T3, after the final driving frequencies of the first working coil 102 and the second working coil 104 are determined, if the driving frequency of the first working coil 102 is increased up to the final driving frequency while the final driving frequency of the second working coil 104 remains unchanged, the difference in driving frequency between the first working coil 102 and the second working coil 104 may be included in the hearing range, which may cause interference noise. According to an embodiment, to address such issue, the first working coil 102 and the second working coil 104 are driven at the same driving frequency, e.g., the second adjustment frequency, at time T3 after the final driving frequency of each working coil is determined.

After the soft start operation is performed, the controller 32 adjusts, e.g., reduces, the respective driving frequencies of the first working coil 102 and the second working coil 104 to the prior-determined final driving frequencies. If the adjustment of driving frequencies is done, the first working coil 102 and the second working coil 104 each are driven at the final driving frequency according to the prior-set output control methods, heating the vessel without causing interference noise.

FIG. 8 is a graph illustrating a process of controlling the driving frequency of each working coil when an induction heating device with a first working coil to a fourth working coil is driven according to an embodiment of the disclosure.

In FIG. 8, f1, f2, f3, and f4, respectively, mean the respective driving frequencies of a first working coil, a second working coil, a third working coil, and a fourth working coil.

If a driving command is input for each of the first working coil, the second working coil, the third working coil, and the fourth working coil, the controller 32 drives all of the first working coil, the second working coil, the third working coil, and the fourth working coil at a final driving frequency (75 kHz) to discover the target frequency of each working coil.

After time 0, the controller 32 reduces the driving frequency of each working coil while measuring the magnitude of power, e.g., output power value, supplied to the vessel via each working coil. The controller 32 reduces the driving frequency of each working coil until the output power value of each working coil matches a required power value of each working coil as set by the user.

Since the output power value of the first working coil at time T1 matches the required power value set by the user for the first working coil, the controller 32 determines that the driving frequency, 64 kHz, of the first working coil at time T1 is the first target frequency of the first working coil and stops driving the first working coil.

Next, since the output power value of the second working coil at time T2 matches the required power value set by the user for the second working coil, the controller 32 determines that the driving frequency, 35 kHz, of the second working coil at time T2 is the second target frequency of the second working coil and stops driving the second working coil.

Then, since the output power value of the third working coil at time T3 matches the required power value set by the user for the third working coil, the controller 32 determines that the driving frequency, 25 kHz, of the third working coil at time T3 is the third target frequency of the third working coil and stops driving the third working coil.

Thereafter, since the output power value of the fourth working coil at time T4 matches the required power value set by the user for the fourth working coil, the controller 32 determines that the driving frequency, 20 kHz, of the fourth working coil at time T4 is the fourth target frequency of the fourth working coil and stops driving the fourth working coil.

As described above, if the respective target frequencies of the first to fourth working coils are determined, the controller 32 determines the final driving frequency of each working coil based on the respective target frequencies of the working coils.

Specifically, the controller 32 compares the absolute values of the differences in target frequency between the working coils with a predetermined first reference value, second reference value, and third reference value and determines the respective final driving frequencies of the working coils according to the results of comparison. In this embodiment, although the first reference value, the second reference value, and the third reference value are assumed to be set to 2 kHz, 8 kHz, and 20 kHz, respectively, the reference values may be set to differ according to embodiments.

The controller 32 first compares the target frequency of the first working coil with the target frequencies of the other three working coils. Since the result of comparison reveals that the absolute values of the differences between the target frequency of the first working coil and the target frequencies of the other three working coils all exceed the third reference value, 20 kHz, the controller 32 sets the final driving frequency of the first working coil to 60 kHz which is the same as the target frequency.

Next, the controller 32 compares the target frequency of the second working coil with the target frequencies of the other three working coils.

The difference between the target frequency (64 kHz) of the first working coil and the target frequency (35 kHz) of the second working coil exceeds the third reference value, 20 kHz. However, the difference between the target frequency (35 kHz) of the second working coil and the target frequency (25 kHz) of the third working coil is 10 kHz which is not less than the second reference value and less than the third reference value. Thus, the controller 32 sets the final driving frequency of the second working coil to 42 kHz so that the difference in final driving frequency between the second working coil and the third working coil is 22 kHz which is the predetermined noise avoidance set value k. Thus, the difference in final driving frequency between the first working coil and the second working coil, the difference in final driving frequency between the second working coil and the third working coil, and the difference in final driving frequency between the first working coil and the second working coil all depart from the hearing range.

Next, the controller 32 compares the target frequency of the third working coil with the target frequencies of the other three working coils. As set above, the difference in final driving frequency between the first working coil and the second working coil, the difference in final driving frequency between the second working coil and the third working coil, and the difference in final driving frequency between the first working coil and the second working coil all are 20 kHz or more. However, the difference between the target frequency (25 kHz) of the third working coil and the target frequency (20 kHz) of the fourth working coil is 5 kHz which is not less than the first reference value and less than the second reference value.

Thus, the controller 32 sets the final driving frequency of the third working coil to 20 kHz which is the same as the target frequency of the fourth working coil and sets the final driving frequency of the fourth working coil to 20 kHz which is the same as the target frequency of the fourth working coil.

If the final driving frequencies of the first to fourth working coils are set as above, the controller 32 sets an output control method of each working coil. Since the final driving frequencies of the first working coil and the second working coil differ from the final driving frequencies of the other working coils, the controller 32 sets the output control methods of the first working coil and the second working coil to the linear control method.

Meanwhile, since the final driving frequency of the third working coil is lower than the target frequency, the controller 32 sets the output control method of the third working coil to the duty control method and sets the output control method of the fourth working coil to the linear control method.

If the output control method of each working coil is so set, the controller 32 drives the working coils at the respective final driving frequencies set as above, at time T4. Hence, the first working coil, the second working coil, and the fourth working coil are driven at 62 kHz, 46 kHz, and 20 kHz, respectively, by the linear control method, and the third working coil is driven at 20 kHz by the duty control method.

Meanwhile, in the embodiment shown in FIG. 8, each working coil is immediately driven at the final driving frequency at time T4. However, according to another embodiment of the disclosure, at time T4, the controller 32 may simultaneously drive the working coils at the second adjustment frequency (e.g., 70 kHz) and then perform the soft start operation to reduce the driving frequency of each working coil to the final driving frequency.

FIG. 9 is a flowchart illustrating a method of controlling an induction heating device according to an embodiment of the disclosure. FIG. 10 is a flowchart illustrating a method of obtaining final driving frequencies of a first working coil and a second working coil according to an embodiment of the disclosure.

Referring to the drawings, according to an embodiment of the disclosure, the controller 32 of the induction heating device first determines the first target frequency of the first working coil 102 and the second target frequency of the second working coil 104 (804).

Next, the controller 32 determines the final driving frequency of the first working coil 102 and the final driving frequency of the second working coil 104 based on the first target frequency and the second target frequency (806).

For example, as shown in FIG. 10, the controller 32 calculates the absolute value M of the difference between the first target frequency and the second target frequency (902). The controller 32 compares the calculated absolute value M of the difference with a predetermined reference value and determines the driving mode of the induction heating device according to a result of the comparison.

If the absolute value M of the difference is not less than a first reference value and less than a second reference value, the controller 32 determines that the driving mode is the coupling mode (normal coupling mode or power coupling mode) (904), and the controller 32 sets the final driving frequency of the first working coil 102 and the final driving frequency of the second working coil 104 to the same frequency (906).

If the absolute value M of the difference is not less than the second reference value and less than a third reference value, the controller 32 determines that the driving mode is the dividing mode (908) and sets the final driving frequency of each working coil so that the final driving frequency of the first working coil 102 and the final driving frequency of the second working coil 104 have as large a difference as a predetermined noise avoidance set value k (910).

If the absolute value M of the difference is less than the first reference value or not less than the third reference value, the controller 32 determines that the driving mode is the normal mode (912), and the controller 32 sets the final driving frequency of the first working coil 102 to the first target frequency and the final driving frequency of the second working coil 104 to the second target frequency (914).

Referring back to FIG. 9, the controller 32 determines the final driving frequencies of the first working coil and the second working coil and then determines the output control methods of the first working coil and the second working coil based on the first target frequency, the second target frequency, the final driving frequency of the first working coil, and the final driving frequency of the second working coil (808).

According to an embodiment of the disclosure, when the driving mode of the induction heating device is determined to be the power coupling mode, the controller 32 sets the output control method of the working coil whose final driving frequency is smaller than the target frequency to a duty control method and sets the output control method of the working coil whose final driving frequency is the same as the target frequency to a linear control method.

According to an embodiment of the disclosure, if the driving mode of the induction heating device is determined to be the normal coupling mode, the controller 32 sets the output control methods of both the first working coil 102 and the second working coil 104 to the linear control method.

According to an embodiment of the disclosure, if the final driving frequency of the first working coil 102 is set to differ from the final driving frequency of the second working coil 104, the controller 32 sets the output control methods of the first working coil 102 and the second working coil 104 to the linear control method.

If the output control method of each working coil is completely set, the controller 32 drives the first working coil 102 and the second working coil 104 at the prior-set final driving frequencies according to the determined output control methods (810). Therefore, the first working coil and the second working coil are driven at their respective final driving frequencies while heating the vessels without causing no interference noise.

As set forth above, the disclosure may reduce interference noise which occurs when two or more working coils in an induction heating device perform heating. For example, if the induction heating device is driven in the coupling mode or dividing mode, the difference in driving frequency between the two working coils departs from the hearing range, so that interference noise decreases.

Further, the disclosure may advantageously reduce interference noise that may arise while the working coils are driven at their determined target frequencies. For example, as described above, according to an embodiment, the soft start operation is carried out which simultaneously drives the first working coil 102 and the second working coil 104 at the second adjustment frequency after the target frequency of the second working coil 104 and the final driving frequency of each working coil are determined. Such soft start operation prevents interference noise which may be caused when two working coils are driven at the same time.

Meanwhile, if the final driving frequency of a particular working coil is set to be lower than the target frequency in determining the final driving frequency of each working coil to prevent interference noise, higher power than the power required by the user may be provided by the working coils. According to an embodiment, when the final driving frequency of a particular working coil is set to be lower than the target frequency, the induction heating device may set the output control method of the working coil to the duty control method, thereby reducing inter-working coil interference noise while allowing the user's desired power to be supplied to the vessel.

Various changes in form or detail may be made to the disclosure by one of ordinary skill in the art without departing from the scope of the disclosure, and the disclosure is not limited to the above-described embodiments and the accompanying drawings.

The invention claimed is:

1. A method of controlling an induction heating device, the method comprising:

determining a first target frequency of a first working coil corresponding to a driving command for the first working coil;

receiving a driving command for a second working coil when the first working coil is driven at the first target frequency;

stopping driving of the first working coil and determining a second target frequency of the second working coil corresponding to the driving command for the second working coil;

determining a final driving frequency of the first working coil and a final driving frequency of the second working coil based on the first target frequency and the second target frequency;

determining output control methods of the first working coil and the second working coil based on the first target frequency, the second target frequency, the final driving frequency of the first working coil, and the final driving frequency of the second working coil; and driving the first working coil and the second working coil at the final driving frequencies according to the determined output control methods.

2. The method of claim 1, wherein the determining the first target frequency of the first working coil includes:

driving the first working coil at a predetermined first adjustment frequency, reducing a driving frequency of the first working coil from the predetermined first adjustment frequency, and determining that the first target frequency is a driving frequency when an output power value of the first working coil matches a required power value corresponding to the driving command for the first working coil.

3. The method of claim 1, wherein the stopping driving the first working coil and the determining the second target frequency of the second working coil includes:

driving the second working coil at a predetermined first adjustment frequency, reducing a driving frequency of the second working coil from the predetermined first adjustment frequency, and determining that the second target frequency is a driving frequency when an output power value of the second working coil matches a required power value corresponding to the driving command for the second working coil.

4. The method of claim 1, wherein the determining the final driving frequency of the first working coil and the final driving frequency of the second working coil includes:

determining a difference between the first target frequency and the second target frequency and determining the final driving frequency of the first working coil and the final driving frequency of the second working coil according to a result of comparison between the difference and a predetermined reference value.

5. The method of claim 4, wherein when the difference is not less than a predetermined first reference value and less than a predetermined second reference value, the final driving frequency of the first working coil and the final driving frequency of the second working coil are set to be identical to each other.

6. The method of claim 5, wherein the final driving frequency of the first working coil and the final driving frequency of the second working coil are set to larger value among the first target frequency and the second target frequency, or a smaller value among the first target frequency and the second target frequency.

7. The method of claim 4, wherein when the difference is not less than a predetermined second reference value and less than a predetermined third reference value, the final driving frequency of the first working coil and the final driving frequency of the second working coil are set to have a difference not less than a predetermined noise avoidance set value.

8. The method of claim 7, wherein the final driving frequency of the first working coil and the final driving frequency of the second working coil are set to a value resulting from increasing a larger value among the first target frequency and the second target frequency to a predetermined noise avoidance set value and a smaller value among the first target frequency and the second target frequency.

9. The method of claim 4, wherein when the difference is less than a predetermined first reference value or not less than a predetermined third reference value, the final driving frequency of the first working coil is set to the first target frequency, and the final driving frequency of the second working coil is set to the second target frequency.

10. The method of claim 1, wherein the determining the output control methods of the first working coil and the second working coil includes:

setting an output control method of a working coil whose final driving frequency is smaller than a target frequency to a duty control method, and setting an output control method of a working coil whose final driving frequency is the same as a target frequency to a linear control method.

11. An induction heating device, comprising:

a first working coil corresponding to a first heating area;

a second working coil corresponding to a second heating area; and a controller configured to determine a driving frequency of the first working coil or the second working coil when a driving command for the first working coil or a driving command for the second working coil is input to drive the first working coil or the second working coil, wherein the controller is configured to:

determine a first target frequency of the first working coil corresponding to the driving command for the first working coil, receive a driving command for the second working coil when the first working coil is driven at the first target frequency, stop driving the first working coil and determine a second target frequency of the second working coil corresponding to the driving command for the second working coil, determine a final driving frequency of the first working coil and a final driving frequency of the second working coil based on the first target frequency and the second target frequency, determine output control methods of the first working coil and the second working coil based on the first target frequency, the second target frequency, the final driving frequency of the first working coil, and the final driving frequency of the second working coil, and drive the first working coil and the second working coil at the final driving frequencies according to the determined output control methods.

12. The induction heating device of claim 11, wherein the controller is configured to drive the first working coil at a predetermined first adjustment frequency, reduce a driving frequency of the first working coil from the predetermined first adjustment frequency, and determine that the first target frequency is a driving frequency when an output power value of the first working coil matches a required power value corresponding to the driving command for the first working coil.

13. The induction heating device of claim 11, wherein the controller is configured to:

drive the second working coil at a predetermined first adjustment frequency, reduce a driving frequency of the second working coil from the predetermined first adjustment frequency, and determine that the second target frequency is a driving frequency when an output power value of the second working coil matches a required power value corresponding to the driving command for the second working coil.

14. The induction heating device of claim 11, wherein the controller is configured to determine a difference between the first target frequency and the second target frequency and determine the final driving frequency of the first working coil and the final driving frequency of the second working coil according to a result of comparison between the difference and a predetermined reference value.

15. The induction heating device of claim 14, wherein when the difference is not less than a predetermined first reference value and less than a predetermined second reference value, the final driving frequency of the first working coil and the final driving frequency of the second working coil are set to be identical to each other.

16. The induction heating device of claim 15, wherein the final driving frequency of the first working coil and the final driving frequency of the second working coil are set to a larger value among the first target frequency and the second target frequency, or a smaller value among the first target frequency and the second target frequency.

17. The induction heating device of claim 14, wherein when the difference is not less than a predetermined second reference value and less than a predetermined third reference value, the final driving frequency of the first working coil and the final driving frequency of the second working coil are set to have a difference not less than a predetermined noise avoidance set value.

18. The induction heating device of claim 17, wherein the final driving frequency of the first working coil and the final driving frequency of the second working coil are set to a value resulting from increasing a larger value among the first target frequency and the second target frequency to a predetermined noise avoidance set value and a smaller value among the first target frequency and the second target frequency.

19. The induction heating device of claim 14, wherein when the difference is less than a predetermined first reference value or not less than a predetermined third reference value, the final driving frequency of the first working coil is set to the first target frequency, and the final driving frequency of the second working coil is set to the second target frequency.

20. The induction heating device of claim 11, wherein the controller is configured to:

set an output control method of a working coil, whose final driving frequency is smaller than a target frequency, to a duty control method, and set an output control method of a working coil, whose final driving frequency is the same as a target frequency, to a linear control method.

* * * * *